United States Patent
Goma et al.

(10) Patent No.: US 8,860,851 B2
(45) Date of Patent: *Oct. 14, 2014

(54) METHOD AND APPARATUS FOR PROCESSING BAD PIXELS

(75) Inventors: Sergiu R. Goma, San Diego, CA (US); Milivoje Aleksic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 13/267,677

(22) Filed: Oct. 6, 2011

(65) Prior Publication Data

US 2012/0019693 A1  Jan. 26, 2012

Related U.S. Application Data

(62) Division of application No. 11/388,937, filed on Mar. 24, 2006, now Pat. No. 8,063,957.

(51) Int. Cl.
*H04N 5/217* (2011.01)
*H04N 5/367* (2011.01)
*H04N 5/235* (2006.01)

(52) U.S. Cl.
CPC .................................... *H04N 5/367* (2013.01)
USPC .................. 348/241; 348/229.1; 348/362

(58) Field of Classification Search
USPC ......... 348/229, 241, 242, 246, 247, 249, 362, 348/363
See application file for complete search history.

(56) References Cited

U.S. PATENT DOCUMENTS

| | | | |
|---|---|---|---|
| 5,796,430 A | 8/1998 | Katoh et al. | |
| 6,381,374 B1 * | 4/2002 | Pourjavid | 382/275 |
| 6,737,625 B2 | 5/2004 | Baharav et al. | |
| 6,806,902 B1 | 10/2004 | Donovan | |
| 7,283,165 B2 | 10/2007 | Alderson et al. | |
| 7,602,438 B2 * | 10/2009 | McGarvey et al. | 348/362 |
| 8,063,957 B2 | 11/2011 | Goma et al. | |
| 2003/0133608 A1 * | 7/2003 | Bernstein et al. | 382/163 |
| 2003/0151673 A1 | 8/2003 | Hashimoto et al. | |
| 2004/0263648 A1 * | 12/2004 | Mouli | 348/243 |
| 2006/0078191 A1 * | 4/2006 | Matsumura | 382/149 |
| 2008/0143856 A1 | 6/2008 | Pinto et al. | |
| 2008/0218610 A1 * | 9/2008 | Chapman et al. | 348/246 |

OTHER PUBLICATIONS

El Gamal, Abbas, et al., "Modeling and Estimation of FPN Components in CMOS Image Sensors," Information Systems Laboratory, Standford University, pp. 1-10, Apr. 1, 1998.

Gossl, C.A. et al., "Image Reduction Pipeline for the Detection of Variable Sources in Highway Crowded Fields," Astronomy & Astrophysics, #381, 2002, pp. 1095-1109.

(Continued)

*Primary Examiner* — Hung Lam
(74) *Attorney, Agent, or Firm* — James R. Gambale, Jr.

(57) ABSTRACT

A technique for processing at least one bad pixel occurring in an image sensing system is provided. Dynamic bad pixel detection is performed on a plurality of streaming pixels taking from at least one controlled image and value and coordinate information for each bad pixel is subsequently stored as stored bad pixel information. Thereafter, static bad pixel correction may be performed based on the stored bad pixel information. The stored bad pixel information may be verified based on histogram analysis performed on the plurality of streaming pixels. The technique for processing bad pixels in accordance with the present invention may be embodied in suitable circuitry or, more broadly, within devices incorporating image sensing systems.

16 Claims, 6 Drawing Sheets

(56) References Cited

OTHER PUBLICATIONS

Gresitello-Dittmar, Mark, et al., "On the Fly Bad Pixel Detection for the Chandra X-ray Observatory's Aspect Camera," Astronomical Data Analysis Software and Systems, X, ASP Conference Series, vol. 238, 2001, Astronomical Society of the Pacific.

Well, Lisa A., et al., "Cleaning Images of Bad Pixels and Cosmic Rays Using IRAF," Sep. 13, 1994.

\* cited by examiner

METHOD AND APPARATUS FOR PROCESSING BAD PIXELS

This application is a divisional of U.S. application Ser. No. 11/388,937, filed Mar. 24, 2006, the entire content of which is incorporated herein by reference.

FIELD OF THE INVENTION

The present invention relates generally to image sensing systems and, in particular, to a method and apparatus for processing of one or more bad pixels in such imaging systems.

BACKGROUND OF THE INVENTION

Digital image sensing systems are well known in the art. In practice, such systems may be included in digital cameras, cellular telephones, digital video cameras, etc. A key component of such image sensing systems are the image sensors, such as arrays of light-sensitive charge-coupled device (CCD) or complementary metal oxide semiconductor (CMOS) sensors (pixels), that convert light into digital signals. Ideally, such sensors arrays provide flawless conversion of the incident light, i.e., each sensor responds identically to all other sensors in the array. In practice, however, this is typically not the case. Due to fundamental imperfections in the individual sensors, a finite number of pixels will be defective. Such defects typically fall into two categories.

In a first category, sometimes referred to as hard faults, a given pixel is "stuck" at a given value and is invariant to incident light. For example, a "white" pixel (assuming a grayscale sensor, although the principle applies equal to color formats) will always have a value at or near the maximum pixel value (e.g., a value of 255 assuming each pixel output is represented in an 8-bit format) regardless of the incident light. Similarly, a "black" pixel will always have a value at or near the minimum pixel value (e.g., a value of 0) regardless of the incident light. In a second category, sometimes referred to as soft faults, pixels are responsive to incident light but deviate visibly from normal response values. For example, a "bright" pixel will saturate much quicker in response to a given level of incident illumination when compared to normal pixels. On the other hand, a "dark" pixel will saturate much more slowly in response to a given level of incident light than a normal pixel.

Both categories of faults are illustrated in FIG. 1, which illustrates pixel behavior, i.e., output value, as a function of exposure and temperature. Note that, as know in the art and as used herein, the term "pixel" may refer to specific locations within an image sensor array or image, or to a specific values corresponding to such locations. An ideal response curve 102 illustrates that, generally, the value of a pixel increases in a linear fashion in accordance with increased exposure and/or temperature. For present purposes, it is assumed that temperatures do not vary greatly and that pixel behavior is more significantly driven by exposure lengths. The shaded region around the ideal response curve 102 illustrates a typical "good" pixel range and is shown to include a response curve of a good pixel 104 falling within the tolerance limits of the ideal response curve 102. FIG. 1 further illustrates behavior of the various categories of bad pixels. For example, a white pixel 106 exhibits the same value (in this case, 255 assuming an 8-bit black and white representation) regardless of the level of exposure. Similarly, a black pixel 108 has a value of 0 regardless of the level of exposure. A bright pixel 110 and a dark pixel 112 are also shown. In essence, the bright pixel 110 and dark pixel 112 exhibit different gain values causing those pixels to either saturate too quickly or too slowly.

A way to combat these "bad" pixels is to store a list of the positions of such pixels in a memory. Typically during image pre-processing, the pixel values corresponding to each such bad pixel is replaced by, for example, the average of the surrounding pixels. While this method (sometimes referred to as static bad pixel processing) is relatively easy to implement (and is therefore preferable), it cannot handle pixel faults that appear intermittently. Furthermore, the stored information identifying each bad pixel is determined by the manufacturer of the sensor array and is invariant thereafter.

Another technique to correct bad pixels (sometimes referred to as dynamic bad pixel detection) uses relatively sophisticated processing techniques to identify and correct bad pixels. Because this technique does not rely on a fixed indication of bad pixels, it can catch intermittently bad pixels. However, they are relatively expensive to implement and, perhaps of greater significance, such filters also tend to remove useful detail from images. For example, and with reference to FIGS. 2 and 3, consider the example of a point source of light. Given the physical limitations of image sensing systems, even the smallest source of light will typically be spread across multiple pixels as illustrated in FIG. 2. As shown in FIG. 2, the point source of light results in a first white pixel 202 surrounded by pixels of varying shades of gray 204, 206 and, further away, by essentially black pixels 208. In contrast, as illustrated in FIG. 3, a bad pixel 302 results in abrupt contrast boundaries with its surrounding pixels. These differences are further illustrated in FIGS. 4 and 5 each comprising a one-dimensional cross section along the middle row of FIGS. 2 and 3, respectively. As shown in FIG. 4, the white pixel 202 (labeled c) is surrounded by gradually transitioning pixels (labeled a, b, d and e). In contrast, the bad pixel 302 (labeled c') has no transitioning neighboring pixels (labeled a', b', d' and e'). Although dynamic bad pixel detection and correction can identify the existence of the bad pixel 302, there is a chance that it will also modify the good pixel 202 and its neighbors 106-108 unnecessarily, depending on how the dynamic bad pixel detection is configured.

Accordingly, it would be advantageous to provide a technique which provides the benefits of both static and dynamic bad pixel detection while overcoming their respective shortcomings described above.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Briefly, the present invention provides a technique for processing at least one bad pixel occurring in an image sensing system. In particular, dynamic bad pixel detection is performed on a plurality of streaming pixels taking from at least one controlled image. In this manner, at least one bad pixel is determined and value and coordinate information for each bad pixel is subsequently stored as stored bad pixel information. Thereafter, static bad pixel correction may be performed based on the stored bad pixel information. The at least one controlled image may be a zero exposure (i.e., dark exposure) image or one or more non-zero exposure images. In one embodiment of the present invention, the stored bad pixel information may be verified based on histogram analysis performed on the plurality of streaming pixels. The resulting histogram data is compared with the stored bad pixel information in order to verify the stored bad pixel information. In a presently preferred embodiment, the comparison is performed by determining a number of pixels from the histogram data corresponding to at least one substantially white pixel bin and comparing it with a number of pixels identified in the stored bad pixel information likewise corresponding to the at least one substantially white pixel bin. When these numbers of pixels are equivalent, the stored pixel information is considered verified. The technique for processing bad pixels in accordance with the present invention may be embodied in suitable circuitry or, more broadly, within devices incorporating image sensing systems.

Figure 6:
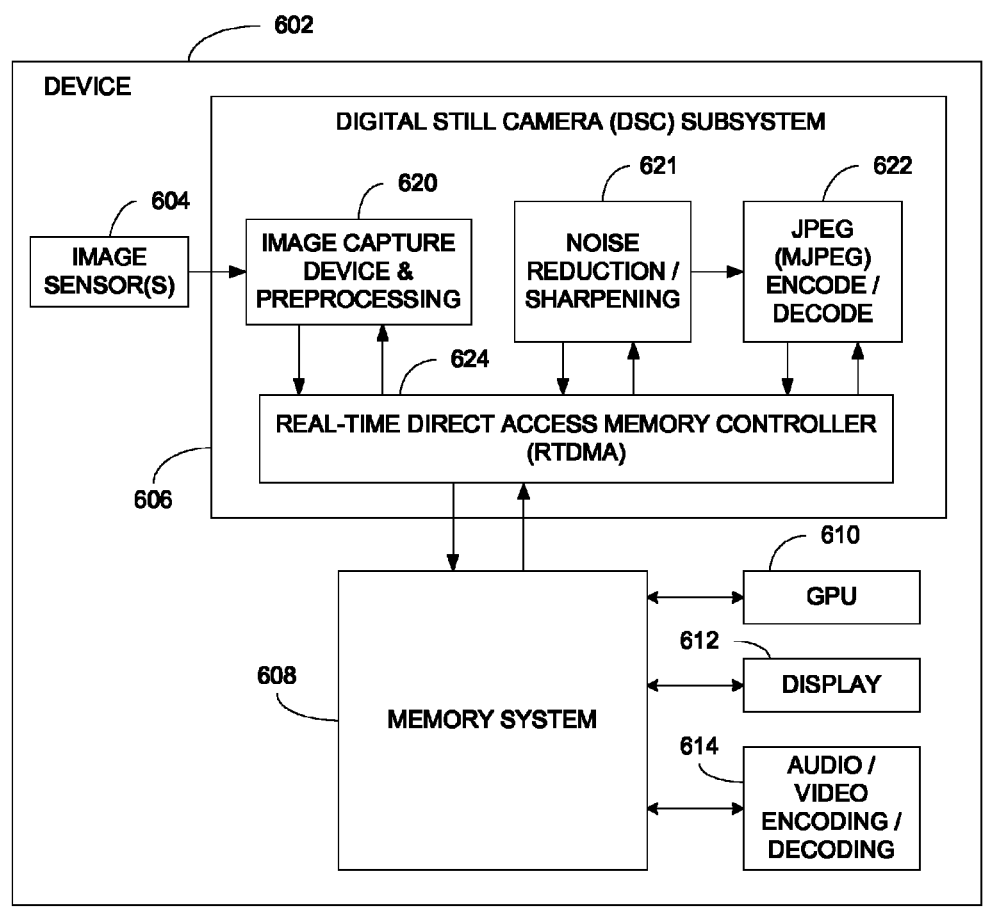
FIG. 6 is a schematic block diagram of a device incorporating an exemplary hardware configuration suitable for implementing various embodiments of the present invention.

The present invention may be more fully described with further reference to FIGS. 6 through 13. Referring now to FIG. 6, a schematic block diagram of a device 602 incorporating an exemplary hardware configuration suitable for implementing various embodiments of the present invention is shown. Generally, the device 602 comprises one or more image sensors 604 in communication with a digital still camera (DSC) subsystem 606. In turn, the DSC subsystem 606 communicates with a memory system 608 suitable for use in performing graphics processing operations of the type described herein. As further illustrated in FIG. 6, a graphics processing unit (GPU) 610, a display 612, and an audio/video encoding/decoding component 614 also communicate with the memory system 608. In general, the image sensors 604, such as CMOS or CCD sensors, are used to provide raw image data (in the form of a plurality of streaming pixels) to the DSC subsystem 606, which, in turn, processes the raw image data and stores the resulting processed image data in the memory system 608. Thereafter, the processed image data is available for further processing by the GPU 610 or the audio/video encoding/decoding component 614. Alternatively, the processed image data may be provided to the display 612 for display to a user of the device 602. Although not illustrated in FIG. 6 for clarity of illustration, devices 602 incorporating the other elements shown in FIG. 6 typically also include a host processor which communicates with various ones of the illustrated elements and controls the overall operation of the device.

As further illustrated in FIG. 6, the DSC subsystem 606 may include various other components. More particularly, the raw image data provided by the image sensors 604 is provided to an image capture and preprocessing block 620. As known in the art, the image capture and preprocessing block 620 performs any preprocessing that may be needed. Such preprocessing may include various correction operations, such as bad pixel detection and correction, to compensate for known limitations of the image sensors, corresponding optics, etc. Data output by the image capture and preprocessing block 620 is provided to the memory system 608 via a real time direct access memory controller (RTDMA) 624. Once stored in the memory system 608, the image data may be further operated upon by a noise reduction/sharpening component which likewise accesses memory system 608 via the RTDMA 624. Image data filtered by the noise reduction/sharpening component is thereafter also provided to the memory system 608. Finally, a JPEG (MJPEG) encode/decode block 622 may also access image data stored in the memory system 608 (whether filtered or not) via the RTDMA 624. Of course, the preprocessed image data, filtered image data or any other image data stored in the memory system 608 may be accessed by the audio/video encoding/decoding component 614 or display 612.

A wide variety of devices may incorporate, or otherwise benefit from use of, the present invention. For example, digital cameras, digital camcorders or any other image capture devices may employ processing in accordance with the present invention. Additionally, devices within a wireless communication system may incorporate or otherwise benefit from the present invention. Devices within wireless communication systems may include wireless handsets, such as cellular telephones or handheld radios, as well as network infrastructure equipment, such as base stations, switches, routers, etc. Each of these devices may perform the techniques described herein or serve as a receiver or transmitter of images that have been processed in accordance with the techniques described herein. Generally, it is preferred that devices incorporating image sensors perform the techniques described herein, although this is not a requirement. For example, a particular element within a wireless network infrastructure may receive unprocessed images from wireless devices and perform the processing described herein. Alternatively, network elements, or even other wireless communication devices, may simply transmit and receive images that were processed elsewhere, by other devices, in accordance with the present invention.

Figure 7:
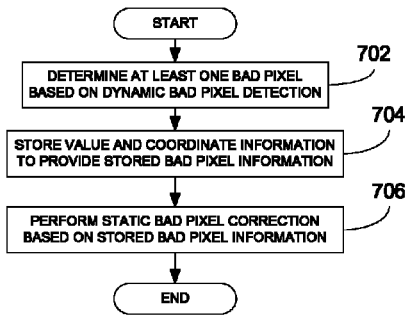
FIG. 7 is a flowchart illustrating processing in accordance with the present invention.

Referring now to FIG. 7, a method for processing at least one bad pixel in accordance with the present invention is further illustrated. Generally, the processing illustrated in FIG. 7 may be implemented entirely in hardware circuitry using, for example, state machines operating under the control of appropriately programmed logic circuits. Alternatively, the process maybe implemented using a general purpose or specialized processor operating under the control of executable instructions that are stored in volatile or nonvolatile memory, such as random access memory (RAM) or read only memory (ROM) or any other suitable storage element. Further still, as those of ordinary skill in the art will readily appreciate, a combination of hardware and software components may be equally employed.

At block 702, at least one bad pixel is determined based on dynamic bad pixel detection. In particular, a plurality of streaming pixels taken from one or more controlled images are analyzed using dynamic bad pixel detection. As used herein, streaming pixels are pixels that are read directly from an image sensing device, whereas controlled images are images obtained using the image sensing device under controlled conditions as determined in accordance with the present invention. Various techniques for performing dynamic pixel detection are well known in the art as taught, for example, in U.S. Pat. No. 6,737,625 issued to Baharav et al. and U.S. Pat. No. 6,806,902 issued to Donovan, although the present invention is not necessarily limited to any one technique. In using dynamic bad pixel detection as a means for identifying bad pixels and subsequently storing information concerning such bad pixels, the present invention represents an improvement over prior art techniques.

For each bad pixel detected at block 702, value and coordinate information is stored at block 704 to provide stored bad pixel information. Because pixels are typically obtained from an image sensor in a know pattern, e.g., read out a successive rows each having a known number of pixels in each row, coordinate information for each pixel is inherently available and may be readily determined. As described in further detail below, this stored bad pixel information can be verified using histogram data derived from the plurality of streaming pixels. Once the stored bad pixel information has been verified, it may be used to perform static bad pixel correction at block 706. Once again, techniques for performing static bad pixel correction are well known to those having skill in the art and the present invention is not limited in this regard. For example, static bad pixel correction may comprise replacing a known bad pixel with a pixel value derived from neighboring pixels, e.g., an average of immediately adjacent pixels. In a preferred embodiment, once the stored bad pixel information has been obtained (and preferably verified), the static bad pixel correction performed at block 706 is preferably performed upon images subsequent to the at least one controlled image used to derive and verify the stored bad pixel information.

Figures 8, 9:
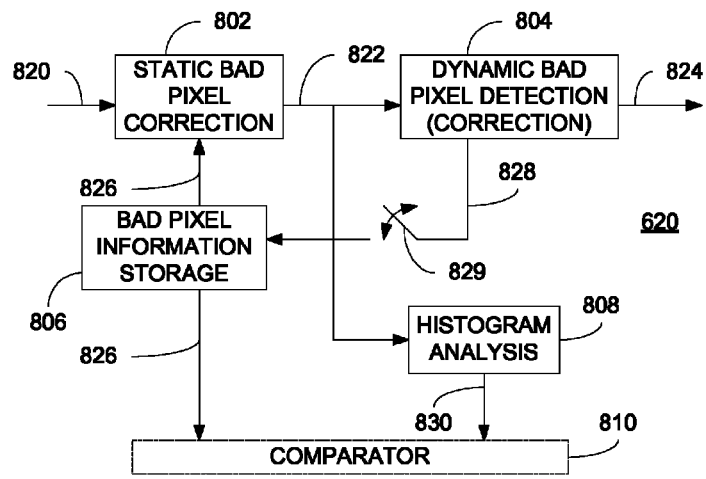
FIG. 8 is a schematic block diagram of a circuit in accordance with the present invention.
FIG. 9 is an illustration of a data structure useful for representing stored bad pixel information in accordance with the present invention.

Referring now to FIG. 8, a circuit that may be incorporated into the image capture and pre-processing component 620 is illustrated in further detail. In particular, a static bad pixel correction component 802, a dynamic bad pixel detection component 804, a bad pixel information storage component 806, a histogram analysis component 808 and a comparator component 810 are further illustrated. As used herein, a component is a constituent part of, either physically or logically, a circuit or another component. In practice, the circuit illustrated in FIG. 8 may be implemented using a suitably programmed logic array, an integrated circuit, or even discrete logic components, as known to those having ordinary skill in the art. Alternatively, such a circuit, may be implemented using software wherein a processor (such as a microprocessor, microcontroller, digital signal processor, etc. or combinations thereof) carries out operations based on stored, executable instructions. For example, in a presently preferred embodiment, all components illustrated in FIG. 8 are implemented using an application-specific integrated circuit (ASIC) with the exception of the comparator 810, which is preferably implemented via a suitable programmed processor, such as a host processor, as described above.

Regardless, the static bad pixel correction component 802 receives a plurality of streaming pixels 820 taking from at least one controlled image. As described in greater detail below, the at least one controlled image may be obtained under varying exposure conditions. In normal operation, the static bad pixel correct component 802 performs correction on the plurality of streaming pixels 820 based on stored bad pixel information 826 residing in the storage component 806. The storage component 806 preferably comprises a re-writable, non-volatile memory although other types of storage devices may be equally employed. Note that, during this operation, a switch 829 (preferably controlled by a host processor) is maintained in an open position thereby preventing any update of the stored bad pixel information residing in the storage component 806. The resulting output pixels 822 are thereafter provided to the dynamic bad pixel detection block 804 that, in normal operation, performs dynamic bad pixel detection and correction using known techniques. The resulting corrected pixels 824 are thereafter available for further processing within the image sensing system.

In accordance with the present invention, the components illustrated in FIG. 8 may be configured such that the dynamic bad pixel detection component 804 is allowed to update the stored bad pixel information 826 residing in the storage component 806. During this operation, the switch 829 is closed (again, preferably under the control of a host processor) thereby allowing the dynamic bad pixel detection component 804 to update the stored bad pixel information 826 in the storage component 806. Furthermore, in this mode, the static bad pixel correction component 802 is disabled such that the plurality of streaming pixel 820 are fed through unmodified. In this mode, the dynamic bad pixel detection component 804 identifies at least one bad pixel and provides value and coordinate information for each such bad pixel to the storage component 806. Note that only information concerning bad pixels is stored in the storage component 806 thereby minimizing storage requirements. However, this is not a requirement and, in an alternate embodiment, information concerning all pixels, not just the bad pixels, may be stored. The value and coordinate information is stored in a machine-readable format in the storage component 806 as further illustrated in FIG. 9. In particular, FIG. 9 illustrates a table comprising up to N entries. As further illustrated, each entry comprises a coordinate data field 902 and a value field 904. For each entry, the coordinate data field provides coordinates identifying a location of a corresponding bad pixel, preferably expressed in x-y coordinates as shown. Likewise, each entry also includes a value (e.g., 0 to 255 for an 8-bit pixel representation) corresponding to the bad pixel as determined by the dynamic bad pixel detection component 804. As described in further detail below, the values stored for each bad pixel are used to verify the stored bad pixel information. Note that the number of entries that may be stored in the storage component 806 is a matter of design choice and, in a presently preferred embodiment, up to 512 such entries may be provided.

In addition to the processing performed by the dynamic bad pixel detection component 804, the histogram analysis component 808 determines histogram data based on the plurality of streaming pixels 820. As described in greater detail below, the resulting histogram data 830 may be used to verify the stored bad pixel information 826. In the embodiment illustrated in FIG. 8, this comparison is done by the comparator component 810, which, as noted previously, is preferably implemented using an appropriately programmed processor.

Figure 10:
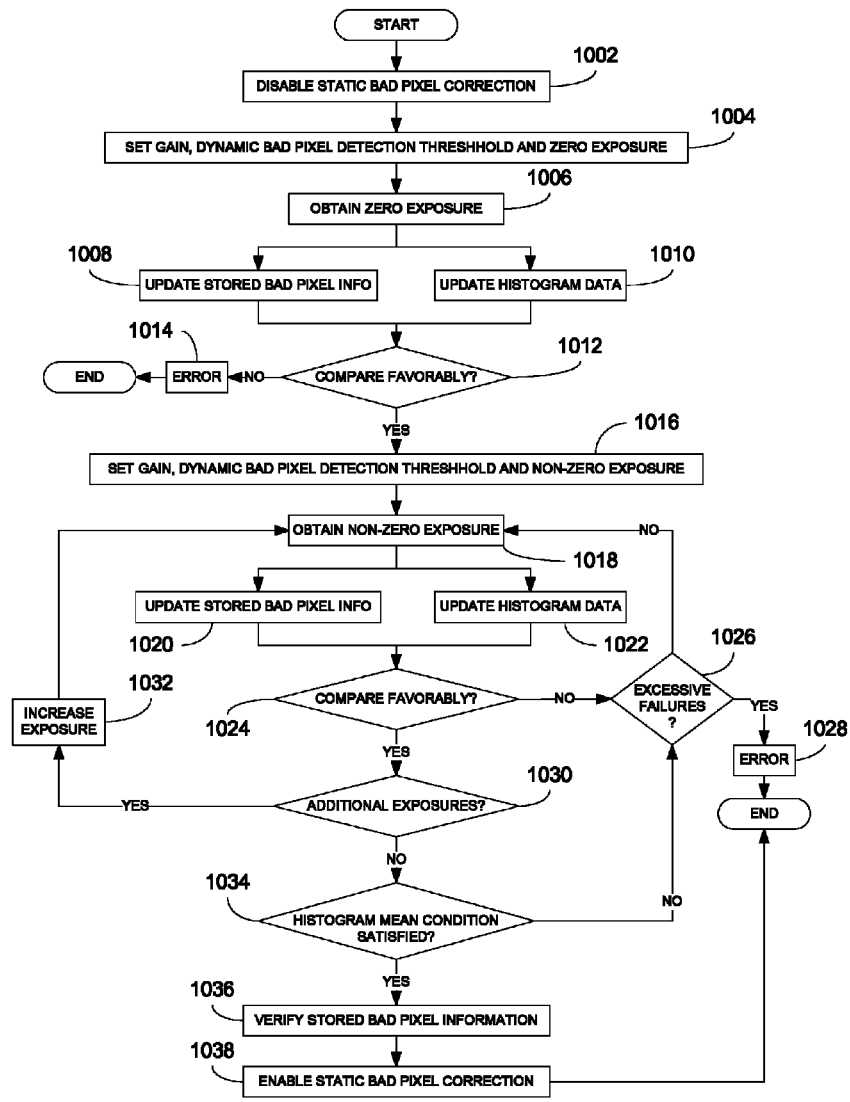
FIG. 10 is a flowchart illustrating more detailed processing in accordance with the present invention.

Referring now to FIG. 10, a more detailed embodiment in accordance with the present invention is further illustrated. Unless otherwise noted, the processing illustrated in FIG. 10 is preferably carried out using a suitably programmed processor, such as a host processor or any other available processor having access to the necessary data. Thus, at block 1002, static bad pixel correction is disabled using known techniques, such as a control bit in a suitably configured register. Thereafter, at block 1004 various parameters are configured prior to obtaining the at least one controlled image. In particular, an analog gain to be applied to the sensor array as well as a dynamic bad pixel detection threshold to be used by the dynamic detection process are set. The analog gain determines a level of amplification to be applied to the sensor array and is preferably set such that white pixels will be output as maximum pixel values (e.g., 255 in an 8-bit representation). The dynamic bad pixel threshold determines the sensitivity of the dynamic bad pixel detection and is preferably set such that the white pixels can be identified. Although the particular values used for these parameters is a matter of design choice, which values may be stored in a suitable memory location, in a presently preferred embodiment, the analog gained determined at block 1004 is set to 2× (although any value not less than 1× should work) and the dynamic threshold is set close to the maximum possible pixel value. Additionally, the image sensor is configured to obtain an image using zero exposure, i.e., to obtain an image comprising no light information. Thereafter, at block 1006, the image sensor supplies a zero exposure image to provide the plurality of streaming pixels to be analyzed.

Figure 11:
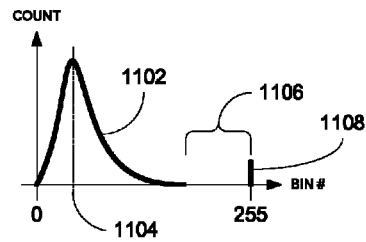
FIGS. 11-13 are graphs illustrating exemplary histogram data that may be used during processing in accordance with the present invention.

The resulting plurality of streaming pixels is analyzed using dynamic bad pixel detection techniques (preferably using the ASIC-embodied component described above) at block 1008 and the resulting value and coordinate information corresponding to the detected bad pixels is used to update the stored bad pixel information. In parallel, the plurality of streaming pixels are also subjected to histogram analysis (again, preferably using the ASIC-embodied component described above) at block 1010 to provide histogram data. As know in the art, histogram data comprises a plurality of bins having a one-to-one correspondence with the possible pixel values in the image, wherein each bin has a value indicative of the number of pixels in the image having the corresponding pixel value. An example of histogram data is further illustrated in FIG. 11 as represented by a histogram curve 1102. In particular, FIG. 11 illustrates a plurality of bins along the x-axis and the corresponding count for each bin along the y-axis. In the example of FIG. 11, it is assumed that each pixel is represented by an 8-bit value thereby resulting in 256 bins labeled 0 through 255. The particular histogram curve 1102 shown is representative of exemplary histogram data that might be obtained in response to a zero exposure image. As such, the curve 1102 exhibits a mean 1104 substantially skewed in the direction of darker (lower) pixel values.

Figure 1:
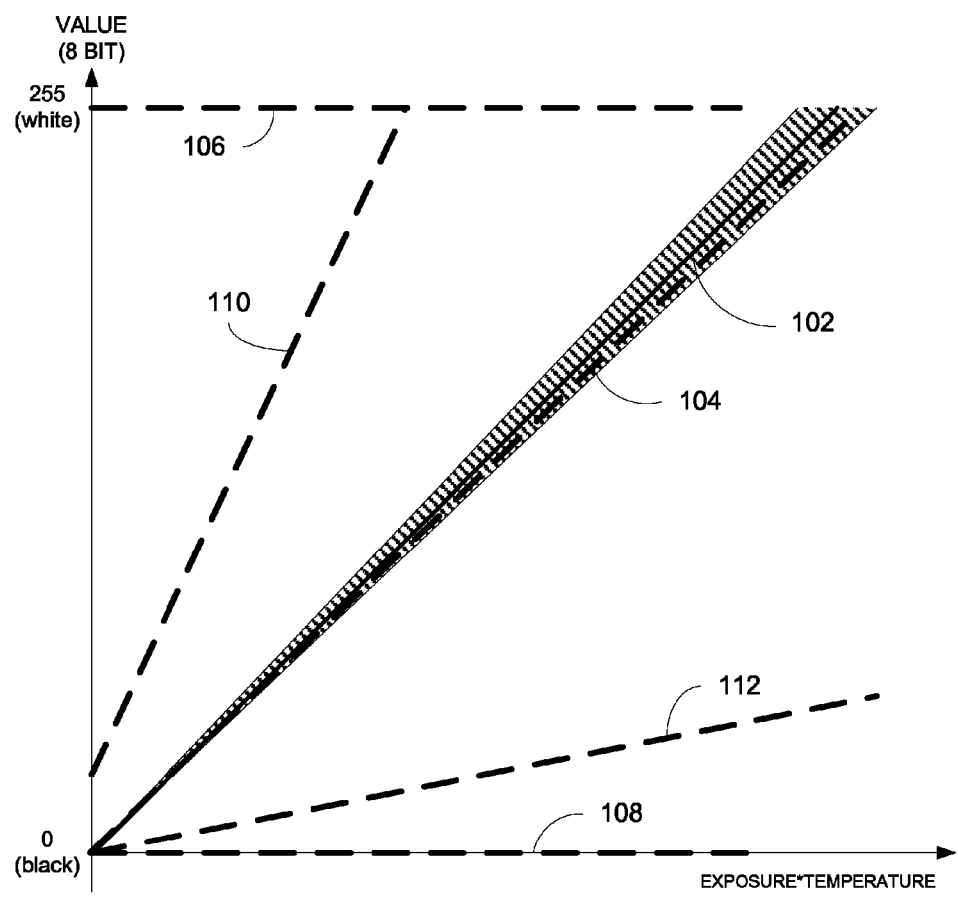
FIG. 1 is a graph illustrating various examples of behavior of good and pixels as a function of exposure and temperature.
Figure 2:
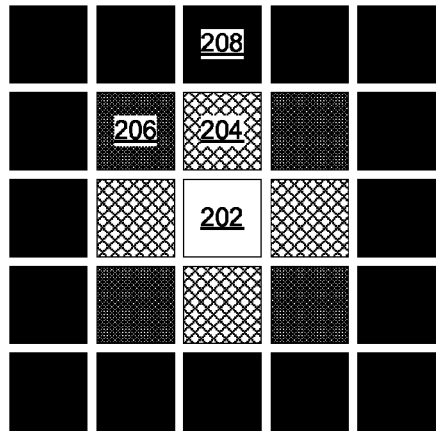
FIG. 2 is a highly magnified illustration of typical responses of a plurality of pixels in response to a point source of light.
Figure 3:
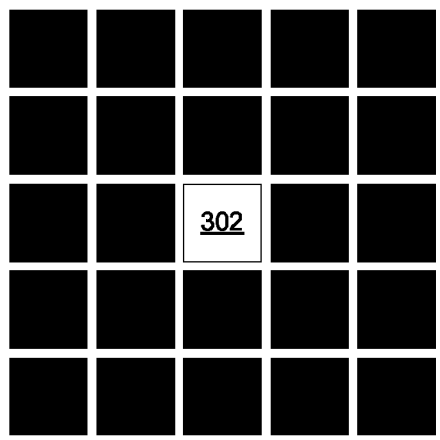
FIG. 3 is a highly magnified illustration of a typical response of a bright or white pixel in the absence of incident light.
Figure 4:
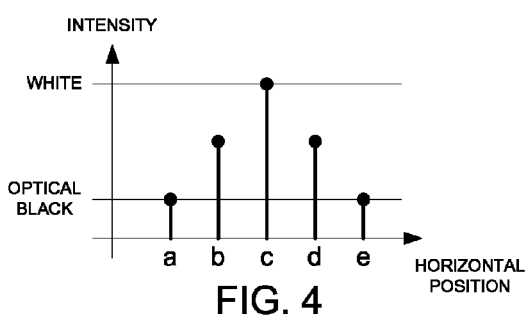
FIG. 4 is a graph illustrating pixel values along a one-dimensional cross-section of a middle row of pixels of FIG. 2.
Figure 5:
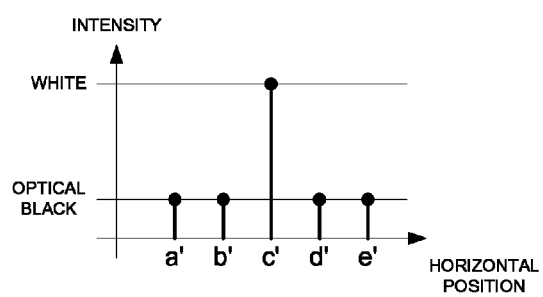
FIG. 5 is a graph illustrating pixel values along a one-dimensional cross-section of a middle row of pixels of FIG. 3.

Referring once again to FIG. 10, at block 1012, the stored bad pixel information and the histogram data are compared. In a presently preferred embodiment, this is accomplished by first accessing the histogram data to ensure that there are a number of hard fault bad pixels indicative of pixels stuck at a substantially white value. This is illustrated in FIG. 11 by a number of histogram-based pixels corresponding to at least one substantially white pixel bin 1108, in this case, specifically bin number 255. In practice, other pixels bins (e.g., bin numbers 254, 253, etc.) may also be included. In order to have confidence that the pixels enumerated in the substantially white bins are in fact bad pixels, it is desirable to ensure that there are a number of empty pixel bins, indicated by reference numeral 1106, occurring between the at least one substantially white pixel bin and that histogram mean 1104. Because there are normally transition pixels bordering substantially white pixels (see FIGS. 2 and 4), such empty bins would not normally occur in the case where the substantially white pixels were not in fact bad pixels. Assuming these conditions are satisfied, the number of histogram-based pixels corresponding to the at least one substantially white pixel bin are compared to the number of bad pixels having identical pixel values as indicated by the stored bad pixel information. For example, if bin number 255 had a count of 10, the stored bad pixel information would be assessed to determine the number of bad pixels therein having a value of 255 (e.g, in the value field 904). If there were 10 such pixels found in the stored bad pixel information, then this is an indication that the stored bad pixel information accurately reflects the number of bad pixels occurring in the image sensor. In this case, referring once again to FIG. 10, the inquiry of block 1012 would be answered in the affirmative. If, however, the comparison was unfavorable, i.e., if the number of histogram-based pixels corresponding to the at least one substantially white pixel bin did not match the number of bad pixels likewise corresponding to the at least one substantially white pixel bin, processing would continue at block 1014 where an error would be indicated and the process subsequently terminated. The error can be used, for example by a host processor, to indicate to a user of the device incorporating the image sensor that the image sensor appears to be malfunctioning. Alternatively, the process described above could be repeated any number of times until a consistent result is obtained.

If the comparison at block 1012 is favorable, processing continues at block 1016 where new gain, bad pixel detection threshold and non-zero exposure parameters are set. The purpose of these new parameters is to ensure that potential non-uniform pixels (e.g., soft fault bright pixels) are discriminated with greater certainty. For this reason, at least one non-zero exposure is needed in order to identify responsive pixels otherwise having a gain that causes them to fall outside the region of acceptable pixel behavior. Thereafter, at block 1018 a non-zero exposure image in accordance with the parameters set at block 1016 is obtained from the image sensor. In a manner identical to the processing at blocks 1008 and 1010, processing continues at blocks 1020 and 1022 wherein the stored bad pixel information is updated as is the histogram data. At block 1024, the same type of comparison operation as performed at block 1012 is again performed based on the updated stored bad pixel information and histogram data. If the comparison is unfavorable, processing continues at block 1026 where it is determined whether an excessive number of failures have occurred as determined, for example, by a running counter. What constitutes an excessive number of failures is a matter of design choice including, for example, a single unfavorable comparison. If too many failures have occurred, processing continues at block 1028 where an error is indicated and the processing subsequently terminated. However, if a excessive number of failures has not yet occurred, processing continues at block 1018 where an additional non-zero exposure is obtained. This process continues until either a favorable comparison is obtained or an excessive number of failures has occurred.

Assuming that a favorable comparison is obtained at block 1024, processing continues at block 1030 where it is determined whether additional exposures are required. The number of additional needed exposures may be tracked using a running counter or similar device as will be evident to those having skill in the art. In one embodiment of the present invention, it is desirable to obtain more than one non-zero exposure in order to verify the stored bad pixel information. The reason for this is that, unlike hard faults, soft faults pixel may be masked by the particular content of the non-zero exposure previously obtained at block 1018. Thus, if additional exposures have not yet been obtained, processing continues at block 1032 wherein an exposure parameter is increased such that a higher-exposure image (i.e., using a longer exposure time) is obtained at block 1018. Processing thereafter continues as above described.

Figure 12:
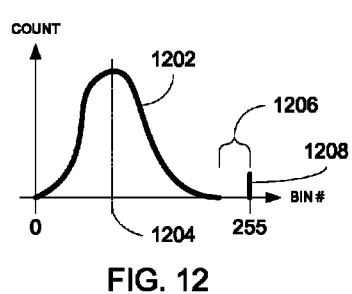
Figure 13:
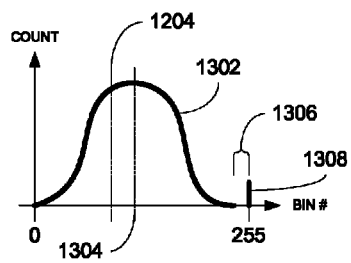

If the additional exposures needed have already been obtained, processing continues at block 1034 where it is further determined whether behavior of the histogram means obtained from the multiple non-zero exposures is in accordance with certain predetermined conditions. In a presently preferred embodiment, it is desirable to determine whether the means of the histograms corresponding to the successive non-zero exposures have moved without changing the number of bad pixels corresponding to at least one substantially white pixel bin and without changing the occurrence of empty pixel bins between histogram means and the at least one substantially white pixel bin. This is further illustrated in FIGS. 12 and 13 in which first and second histogram curves 1202, 1302 have been obtained for different non-zero exposure images. In particular, the second histogram curve 1302 corresponds to a non-zero exposure in which the exposure is greater than the exposure used to obtain the first histogram curve 1202. As shown, a second histogram mean 1304 for the second histogram curve 1302 has shifted relative to a first histogram mean 1204 for the first histogram curve 1202. Despite this shift in histogram means, the occurrence of empty bins between the histogram mean and the at least one substantially white pixel bin has been preserved. This is illustrated in FIG. 12 where a number of empty pixel bins 1206 occur between the first histogram mean 1204 and the at least one substantially white pixel bin 1208. Likewise, in FIG. 13, a number of empty bins 1306 (albeit a lesser number of empty pixel bins) occur between the second histogram mean 1304 and at least one substantially white pixel bin 1308. If the above-described conditions are not satisfied at block 1034, processing continues at block 1026 as previously described. If the condition at block 1034 is satisfied, processing continues at block 1036 where the stored bad pixel information is verified and, subsequently, static bad pixel correction is re-enabled at block 1038. As used herein, the stored bad pixel information is effectively verified when it is used to perform static bad pixel correction.

The present invention provides a technique for processing bad pixels. By using dynamic bad pixel detection to populate a table of stored bad pixel information, the present invention obtains the benefits of both static and dynamic bad pixel detection and correction. Furthermore, using histogram analysis, the present invention provides a degree of certainty that substantially all bright or white bad pixels have been detected. In this manner, the present invention can improve the quality of images obtained using digital image sensing systems.

It is therefore contemplated that the present invention cover any and all modifications, variations or equivalents that fall within the spirit and scope of the basic underlying principles disclosed above and claimed herein. For example, although the examples used to explain the present invention have been described in terms of grayscale pixel values, the techniques described herein may be equally applied to various color pixel representations without loss of generality.

What is claimed is:

1. A method of processing one or more bad pixels in an imaging system, the method comprising:
    performing a dynamic bad pixel detection process on a plurality of pixels from at least one image to detect the one or more bad pixels;
    storing value and coordinate information only for each one of the one or more bad pixels detected by the dynamic bad pixel detection process to provide stored bad pixel information;
    performing histogram analysis on the plurality of pixels to determine histogram data;
    determining, based on the histogram data, a number of histogram-based pixels corresponding to at least one substantially white pixel bin;
    determining, based on the stored bad pixel information, a number of bad pixels corresponding to the at least one substantially white pixel bin; and
    comparing the number of histogram-based pixels corresponding to the at least one substantially white pixel bin with the number of bad pixels corresponding to the at least one substantially white pixel bin to verify the stored bad pixel information.

2. The method of claim 1, further comprising:
    performing static bad pixel correction only on the one or more bad pixels detected by the dynamic bad pixel detection process based on the stored bad pixel information.

3. The method of claim 1, wherein performing static bad pixel correction comprises performing static bad pixel correction on images subsequent to the at least one image based on the stored bad pixel information.

4. The method of claim 1, wherein performing histogram analysis further comprises determining that the histogram data is valid when there is at least one empty bin occurring between at least one substantially white pixel bin and a histogram mean bin.

5. The method of claim 1, further comprising:
    when the number of histogram-based pixels corresponding to the at least one substantially white pixel bin compares favorably with the number of bad pixels corresponding to the at least one substantially white pixel bin, verifying the stored bad pixel information.

6. The method of claim 5, further comprising:
    obtaining a zero exposure image to provide the at least one image.

7. The method of claim 1, further comprising:
    obtaining at least two non-zero exposure images to provide the at least one image, wherein exposure of each non-zero exposure image is greater than exposure of previous non-zero exposure images.

8. A circuit for processing one or more bad pixels in an image system, the circuit comprising:
    a dynamic bad pixel detection component operative to perform dynamic bad pixel detection process on a plurality of pixels from at least one image to detect the one or more bad pixels and to determine value and coordinate information for each one of the one or more bad pixels;
    a bad pixel information storage component, coupled to the dynamic bad pixel detection component, operative to store the value and coordinate information only for each one of the one or more bad pixels detected by the dynamic bad pixel detection process as stored bad pixel information;
    a histogram analysis component operative to receive the plurality of pixels and to determine histogram data based on the plurality of pixels;
    a comparison component coupled to the bad pixel information storage component and the histogram analysis component operative to:
        determine, based on the histogram data, a number of histogram-based pixels corresponding to at least one substantially white pixel bin;
        determine, based on the stored bad pixel information, a number of bad pixels corresponding to the at least one substantially white pixel bin; and
        when the number of histogram-based pixels corresponding to the at least one substantially white pixel bin compares favorably with the number of bad pixels corresponding to the at least one substantially white pixel bin, verify the stored bad pixel information.

9. The circuit of claim 8, further comprising:
a static bad pixel correction component, coupled to the bad pixel information storage component, operative to perform static bad pixel correction only on the one or more bad pixels detected by the dynamic bad pixel detection process based on the stored bad pixel information.

10. A device comprising:
at least one image sensor that provides at least one image comprising a plurality of pixels; and
   a processing circuit, in communication with the at least one image sensor, operative to perform dynamic bad pixel detection process on the plurality of pixels to detect one or more bad pixels, to determine value and coordinate information for each one of the one or more bad pixels, to store the value and coordinate information only for each one of the one or more bad pixels detected by the dynamic bad pixel detection as stored bad pixel information, to perform histogram analysis based on the plurality of pixels to provide histogram data, to determine, based on the histogram data, a number of histogram-based pixels corresponding to at least one substantially white pixel bin, to determine, based on the stored bad pixel information, a number of bad pixels corresponding to the at least one substantially white pixel bin, and when the number of histogram-based pixels corresponding to the at least one substantially white pixel bin compares favorably with the number of bad pixels corresponding to the at least one substantially white pixel bin, verify the stored bad pixel information.

11. The device of claim 10, wherein the processing circuit is further operative to perform static bad pixel correction only on the one or more bad pixels detected by the dynamic bad pixel detection process based on the stored bad pixel information to provide at least one corrected pixel.

12. The device of claim 10, further comprising:
a display, in communication with the processing circuit, operative to display the at least one corrected pixel.

13. A circuit for processing one or more bad pixels in an imaging system, the circuit comprising:
means for performing dynamic bad pixel detection on a plurality of pixels from at least one image to detect the one or more bad pixels;
means for storing value and coordinate information only for each one of the one or more bad pixels detected by the dynamic bad pixel detection to provide stored bad pixel information;
means for performing histogram analysis on the plurality of pixels to determine histogram data;
means for determining, based on the histogram data, a number of histogram-based pixels corresponding to at least one substantially white pixel bin;
means for determining, based on the stored bad pixel information, a number of bad pixels corresponding to the at least one substantially white pixel bin; and
means for comparing the number of histogram-based pixels corresponding to the at least one substantially white pixel bin with the number of bad pixels corresponding to the at least one substantially white pixel bin to verify the stored bad pixel information.

14. A method of processing one or more bad pixels in an imaging system, the method comprising:
obtaining stored bad pixel information, wherein the stored bad pixel information is based on at least one image;
obtaining histogram data, wherein the histogram data is based on the at least one image; and
verifying the stored bad pixel information when a number of histogram-based pixels, as determined using the histogram data, corresponding to at least one substantially white pixel bin compares favorably with a number of bad pixels, as determined using the stored bad pixel information, corresponding to the at least one substantially white pixel bin.

15. A circuit for processing one or more bad pixels in an imaging system, the circuit comprising:
a bad pixel information storage component operative to store bad pixel information for each one of one or more bad pixels; and
a histogram analysis component operative to obtain stored bad pixel information from the bad pixel information storage component, wherein the stored bad pixel information is based on at least one image, obtain histogram data, wherein the histogram data is based on the at least one image, and verify the stored bad pixel information when a number of histogram-based pixels, as determined using the histogram data, corresponding to at least one substantially white pixel bin compares favorably with a number of bad pixels, as determined using the stored bad pixel information, corresponding to the at least one substantially white pixel bin.

16. A circuit for processing one or more bad pixels in an imaging system, the circuit comprising:
means for obtaining stored bad pixel information, wherein the stored bad pixel information is based on at least one image;
means for obtaining histogram data, wherein the histogram data is based on the at least one image; and
means for verifying the stored bad pixel information when a number of histogram-based pixels, as determined using the histogram data, corresponding to at least one substantially white pixel bin compares favorably with a number of bad pixels, as determined using the stored bad pixel information, corresponding to the at least one substantially white pixel bin.

* * * * *